K. ALQUIST.
DOUBLE REDUCTION GEARING.
APPLICATION FILED JUNE 29, 1915.
1,165,829.
Patented Dec. 28, 1915.
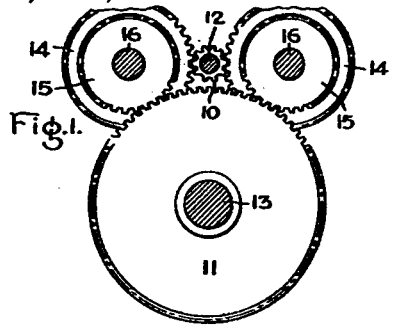
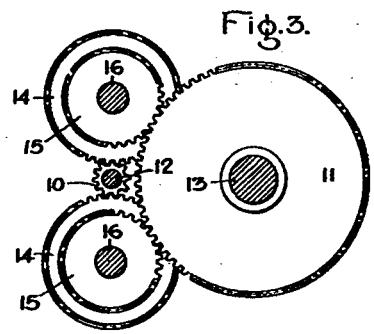
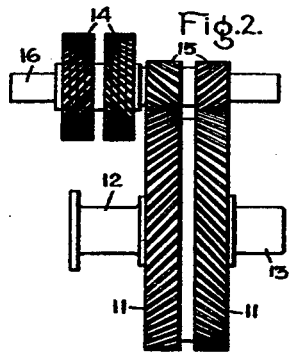
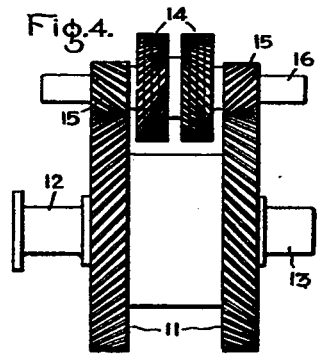
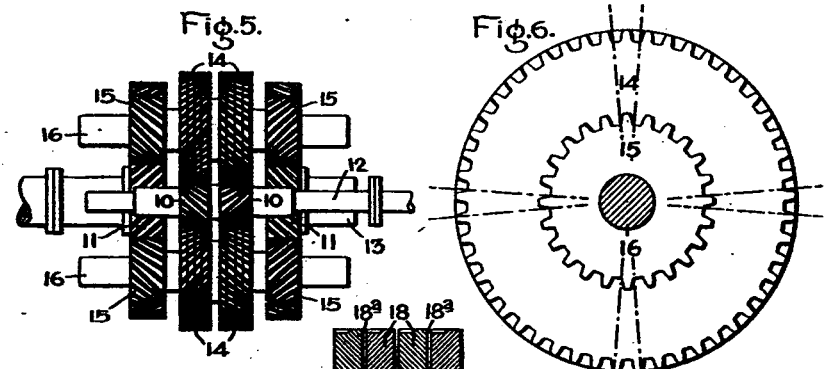
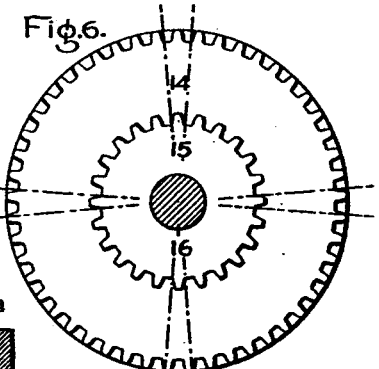
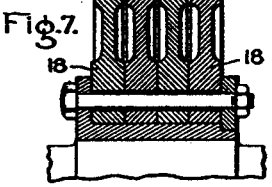
Inventor:
Karl Alquist,
by: *[signature]*
His Attorney.

UNITED STATES PATENT OFFICE.

KARL ALQUIST, OF SCHENECTADY, NEW YORK.

DOUBLE REDUCTION-GEARING.

1,165,829.  Specification of Letters Patent.  Patented Dec. 28, 1915.

Application filed June 29, 1915. Serial No. 36,961.

*To all whom it may concern:*

Be it known that I, KARL ALQUIST, a subject of the King of Sweden, residing at Schenectady, county of Schenectady, State of New York, have invented certain new and useful Improvements in Double Reduction-Gearing, of which the following is a specification.

The present invention relates to power transmission by means of double reduction gearing and is a continuation in part of my application Serial No. 812,812, filed Jan. 17, 1914.

The invention is applicable to gearing for either speed reduction or multiplication but the more general field is for speed reduction and as a matter of convenience the invention is described in connection with reduction gearing, but it will be understood that it is not necessarily limited thereto.

The invention relates more particularly to double reduction high speed gearing intended to transmit large loads with relatively great speed reduction.

It comprises a double reduction gearing in which the drive between the high speed pinion and the low speed gear is through two sets of intermediate gear wheels which operate in parallel to transmit the load, each set comprising a high speed wheel and a low speed pinion mounted in fixed angular relation to each other as by being fixed on the same shaft, and in which one of the wheels of each set, as the high speed wheel, is in the form of an elastic or flexible wheel. By this arrangement I am enabled to decrease the length of the high speed or driving pinion and hence the width of face of the gearing by one half for a certain power to be transmitted. This is due to the fact that in view of the elasticity of the intermediate wheels it is insured that at all times the load is equally divided between the two intermediate sets. Further, I arrange the shaft carrying the driving pinion in line with those carrying the intermediate wheels and with the driving pinion thus balanced between the intermediate elastic elements, the pinion bearings receive no part of the driving thrusts as the thrusts will be transmitted to and taken up by the bearings of the intermediate gear-wheels. This is of great advantage in that it is much easier to provide substantial bearings for these intermediates than for the driving pinion. The driving pinion also is not subject to bending strains and any torsional deflections or imperfections in the gear teeth will be taken care of by the elastic elements.

My invention also comprises a double reduction gearing in which the number of teeth in the pinion wheel of each intermediate set have incommensurate ratios. The purpose of this will be explained more fully hereinafter.

In the accompanying drawing Figure 1 is a diagrammatic elevation of a gearing embodying my invention; Fig. 2 is a side view of Fig. 1; Fig. 3 is a view similar to Fig. 1 illustrating another arrangement of my invention; Fig. 4 is a side elevation and Fig. 5 a plan view of still another arrangement of my invention ; Fig. 6 is a more or less diagrammatic view illustrating the arrangement of the intermediate gear-wheels whereby I am enabled to obtain proper meshing of the intermediate gear-wheels with the high speed driving pinion and the driven wheel; and Fig. 7 is a sectional view of a preferred form of elastic gear-wheel.

Referring to Figs. 1 and 2, 10 indicates the high speed pinion and 11 the low speed wheel, fixed on driving shafts 12 and 13 respectively. Power is transmitted from the one to the other through two sets of intermediate gear-wheels, each comprising a high speed wheel 14 and a low speed pinion 15 mounted on the same shaft 16. These sets are arranged to transmit the load in parallel, the high speed pinion 10 being balanced between the two wheels 14. As will be obvious the arrangement constitutes a double reduction gearing. The gearing is preferably of the double or herring-bone type of helical gearing as such gearing possesses certain well recognized advantages as to smoothness of running and other qualities. The high speed wheels 14 are in the form of elastic or flexible wheels and are preferably of the double or herring-bone type of helical elastic gear-wheel invented by me and shown specifically in Fig. 7. Such a gear-wheel comprises a plurality of elastic or flexible laminations or plates 18 rigidly mounted on the shaft or support and having a small clearance space between each two plates near the periphery as indicated at 18ª. The face of the gear-wheel is provided with helically cut teeth which thus are free to yield laterally by a slight amount under the pressure of the teeth of the coöperating gear-wheels. This yielding of the teeth is due to the fact that the metal plates are elastic and also to the fact that each plate at its periphery is separated from the other by a small space. These elastic gear-wheels as already pointed out yield slightly under tooth pressure to compensate for any slight inaccuracies in the gearing, and also for any slight inaccuracies in the shaft alinements and make possible the successful use of the double parallel drive for transmitting the load. The importance of this in connection with double reduction gearing will be appreciated when it is considered that with such gearing an error in the teeth of the low speed wheel or high speed pinion would cause a sudden change in the angular velocity of the pinion, and that the gear-wheels on the intermediate shaft engaging the high speed pinion and low speed wheel would transmit such error magnified in the ratio of the intermediate gear-wheels to each other, were such inaccuracy not taken care of by the elastic elements. Also were the inequalities not taken care of by the elastic elements, the load would not be equally divided between the gear-wheels in parallel but there would be points of excessive strains on one or the other which would be detrimental to the gearing as is obvious. These inequalities are due to the fact that it is in practice not possible to get perfect shape of teeth or to get the gear shafts absolutely alined so that the teeth of the high speed pinion will mesh properly throughout their length with the wheels on each side to obtain an even drive; and in helical gearing there is a further difficulty in getting the center distances between the respective wheels absolutely equal, which is necessary unless there is some arrangement to permit of the axial adjustment of the helical gearing as such gear-wheels have a perfectly definite relative axial position. These difficulties, however, are overcome by my invention since the elastic elements yield sufficiently to compensate for such inequalities.

In Fig. 3 an arrangement quite similar to that of Figs. 1 and 2 is shown, the pinion and intermediate gear-wheels being arranged at the side of the driven wheel rather than above it. In this figure the same reference numerals are used to designate the parts as are used in connection with Figs. 1 and 2. In this figure and also in Figs. 1 and 2, the shaft 12 is directly in line with shafts 16 thus balancing the pinion 10 between wheels 14.

In Figs 4 and 5, the general arrangement is the same as before except that the low speed wheel 14 and the low speed pinion 15 have been divided, and the high speed driving pinion 10 and high speed elastic wheels 14 placed between them. This gives a compact arrangement with equalized bearing pressure.

In assembling a gearing of this type it is generally desirable to avoid the necessity for any adjustment of the high speed pinion bearings in order to obtain correct meshing of the teeth of the respective gear-wheels, and for this purpose, I select the gear-wheels 14 and 15 so that the ratios between the number of teeth in them will be incommensurate.

The number of teeth in the intermediate wheels 14 is generally much larger than the number of teeth in the intermediate pinions 15. If now I make the number of teeth in each intermediate set such that the number of teeth in the wheels 14 are not evenly divisible by the number of teeth in the pinions 15, the relative angular positions of the teeth will evidently vary around the wheel. The most suitable ratios are those where the number of teeth in the wheels 14 are one more or one less than an even multiple of the number of teeth in the pinions 15. If these pinions have, say 16 teeth, the wheels 14 may for instance have 31 or 33 teeth, or 47 or 49 teeth, etc. In this way after the position of the teeth on the driving pinion 10 has been fixed by meshing with the wheel 14 of one of the intermediate sets, the position of which set in its turn is fixed by the wheel 11 meshing with pinion 15, I can adjust the other intermediate set by trying different teeth of the pinion 15 of such other set in mesh with the wheel 11 until a position is found where the error in meshing between the teeth 15 of this other set and the pinion 10 is a minimum and small enough to be taken care of by the flexibility. This will be clearly understood from the fact that when the pinion 15 is shifted one tooth, the wheel 14 is shifted a little bit more or less than two, three or more teeth, as the case may be, and there will thus always be one position where wheel 14 will mesh with pinion 10 with a very small error. In this way I can manufacture the wheels and pinions 14 and 15 without reference to their relative positions on the shaft and yet get an accurate meshing of the gears. This will be better understood by reference to the diagram shown in Fig. 6, where the pinion 15 has 24 teeth and the wheel 14 has 49 teeth, that is two times 24 plus 1. Every tooth in pinion 15 has thus a corresponding group of two teeth in wheel 14, but on account of the extra tooth, each group has a different angular position with reference to the corresponding tooth in pinion 15, as indicated by the dotted lines, and there is thus one position of the intermediate gear-wheels where the teeth will closely mesh with the pinion 10 and the wheel 11 and any slight error which still may be found will be taken up by the flexibility. By this means I avoid any possibility of having to adjust the high speed pinion bearings in order to obtain direct meshing of the gear wheels.

The broad general invention disclosed is not claimed herein, as it is claimed in my companion application Serial No. 37,979 filed July 3, 1915.

In accordance with the provisions of the patent statutes, I have herein set forth the principles of my invention and described the best embodiment thereof at present known to me, but I desire to have it understood that the apparatus shown is only illustrative and that the invention can be carried out by other means.

What I claim as new, and desire to secure by Letters Patent of the United States, is

1. In a double reduction gearing, the combination of a high speed pinion, a low speed wheel, and two sets of intermediate gear-wheels arranged in parallel between the pinion and low speed wheel to transmit the load from one to the other, each set comprising a gear wheel having elastic or flexible teeth.

2. In a double reduction gearing, the combination of a high speed pinion, a low speed wheel and two sets of intermediate gear-wheels arranged in parallel between the pinion and the low speed wheel to transmit the load from one to the other, each set comprising two gear-wheels rigidly mounted in fixed angular relation to each other and in mesh respectively with the high speed pinion and low speed wheel, the intermediate wheel which is in mesh with the high speed pinion having elastic or flexible teeth.

3. In a double reduction helical gearing, the combination of a high speed pinion, a low speed wheel, and two sets of intermediate gear wheels arranged between the pinion and the low speed wheel to transmit the load from one to the other, each set comprising an elastic or flexible wheel formed of a plurality of laminæ or disks clamped together at their central portions and slightly spaced apart at their peripheries so as to be capable of yielding slightly under tooth pressure.

4. In spur gearing, the combination of a driving pinion, a wheel to be driven, and a plurality of driving connections between them each comprising a gear-wheel in mesh with said driving pinion and a gear wheel coaxial therewith and in fixed angular relation thereto in mesh with said wheel to be driven, said latter gear wheels having in different parts of their peripheries different angular distances between their teeth that are nearest to angular coincidence.

5. In spur gearing, the combination of a driving pinion, a wheel to be driven, and a plurality of driving connections between them each comprising a gear wheel in mesh with said driving pinion and a gear-wheel coaxial therewith and in fixed angular relation thereto in mesh with the wheel to be driven, the number of teeth in the larger of said intermediate gear-wheels differing by one from a multiple of the number of teeth in the smaller.

6. In a double reduction gearing, the combination of a high speed pinion, a low speed wheel, and two sets of intermediate gear-wheels arranged in parallel between the pinion and low speed wheel to transmit the load from one to the other, each set comprising two wheels rigidly mounted in fixed angular relation to each other and in mesh respectively with the high speed pinion and low speed wheel, the intermediate gear-wheels which are in mesh with the high speed pinion having elastic or flexible teeth and being arranged on diametrically opposite sides of the high speed pinion.

7. In a double reduction helical gearing, the combination of a high speed pinion, a low speed wheel, and two sets of intermediate gear-wheels arranged in parallel between the pinion and low speed wheel to transmit the load from one to the other, each set comprising an elastic or flexible gear-wheel formed of a plurality of laminæ or disks clamped together at their central portions and slightly spaced apart at their peripheries so as to be capable of yielding slightly under tooth pressure, the number of teeth in said flexible gear-wheels bearing an incommensurate ratio to the number of teeth in the other gears of said sets.

8. In spur gearing the combination of a helical high speed pinion, a helical low speed wheel, shafts therefor, two elastic helical gear-wheels in mesh with the pinion and arranged on diametrically opposite sides thereof so that the pinion is balanced between them, shafts for the elastic gear-wheels, and helical gear-wheels in fixed angular relation to said elastic gear-wheels and driven from said last named shafts which are in mesh with the helical low speed wheel.

9. In spur gearing, the combination of a shaft, a low speed helical gear-wheel, comprising two halves spaced apart and mounted on the shaft; two sets of intermediate gear wheels each comprising a shaft, a helical wheel formed in two halves which are spaced apart on said shaft and mesh with the respective halves of the low speed gear, and an elastic helical gear wheel mounted on such shaft between said halves; and a high speed helical pinion in mesh with said elastic gear-wheels.

In witness whereof, I have hereunto set my hand this 28th day of June 1915.

KARL ALQUIST.